United States Patent
Jo et al.

(10) Patent No.: US 9,282,167 B2
(45) Date of Patent: Mar. 8, 2016

(54) DISPLAY DEVICE AND CONTROL METHOD THEREOF

(75) Inventors: Sun-haeng Jo, Suwon-si (KR); Gyung-hye Yang, Seoul (KR); Dong-heon Lee, Seoul (KR); Jung-geun Kim, Suwon-si (KR); Soo-Yeoun Yoon, Seoul (KR); Yoo-tai Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/313,464

(22) Filed: Dec. 7, 2011

(65) Prior Publication Data

US 2012/0144347 A1    Jun. 7, 2012

(30) Foreign Application Priority Data

Dec. 7, 2010 (KR) .................. 10-2010-0124448

(51) Int. Cl.
| | | |
|---|---|---|
| G06F 3/033 | (2013.01) | |
| H04L 29/08 | (2006.01) | |
| G06F 3/0488 | (2013.01) | |
| G06F 3/0486 | (2013.01) | |
| G06F 3/0481 | (2013.01) | |

(52) U.S. Cl.
 CPC ............. H04L 67/36 (2013.01); G06F 3/0486 (2013.01); G06F 3/04817 (2013.01); G06F 3/04883 (2013.01)

(58) Field of Classification Search
 CPC ................ G06F 2221/0704; G06F 17/212
 USPC ........................ 715/764, 762, 723; 707/722
 See application file for complete search history.

(56) References Cited

U.S. PATENT DOCUMENTS

| | | | | |
|---|---|---|---|---|
| 2002/0089488 | A1* | 7/2002 | McBrearty et al. | 345/157 |
| 2002/0116539 | A1* | 8/2002 | Bryczkowski et al. | 709/317 |
| 2007/0146347 | A1  | 6/2007 | Rosenberg | |
| 2009/0030971 | A1* | 1/2009 | Trivedi et al. | 709/203 |

(Continued)

FOREIGN PATENT DOCUMENTS

| | | | |
|---|---|---|---|
| EP | 1 933 243 | A2 | 6/2008 |
| EP | 2 192 478 | A2 | 6/2010 |
| KR | 10-2009-0084634 | A | 8/2009 |

OTHER PUBLICATIONS

Communication dated Dec. 5, 2011, issued by the European Patent Office in corresponding European Patent Application No. 11168761.2.

*Primary Examiner* — William Bashore
*Assistant Examiner* — Rayeez Chowdhury
(74) *Attorney, Agent, or Firm* — Sughrue Mion, PLLC

(57) ABSTRACT

A display device and a control method thereof are provided. The display device includes: a touch screen which displays a screen and senses a gesture of a user on the screen; a video processor which process an image for displaying the screen; a communication unit which performs communication with at least one neighboring device; and a controller which performs control to display a miniature image of a screen of contents being displayed and a first user interface (UI) item showing a connected neighboring device of the at least one neighboring device if a first gesture of a user is made while displaying the screen corresponding to predetermined contents, and to transmit information for sharing the contents to the corresponding neighboring device in accordance with a second gesture of a user with regard to the miniature image and the first UI item.

28 Claims, 13 Drawing Sheets

(56) References Cited

U.S. PATENT DOCUMENTS

| | | | |
|---|---|---|---|
| 2009/0183088 A1* | 7/2009 | Saka | 715/751 |
| 2009/0189868 A1* | 7/2009 | Joo et al. | 345/173 |
| 2010/0077334 A1* | 3/2010 | Yang et al. | 715/769 |
| 2010/0138780 A1* | 6/2010 | Marano et al. | 715/804 |
| 2010/0138828 A1* | 6/2010 | Hanquez et al. | 718/1 |
| 2010/0220067 A1* | 9/2010 | Yang | 345/173 |
| 2010/0293502 A1* | 11/2010 | Kang et al. | 715/803 |
| 2010/0302179 A1* | 12/2010 | Ahn et al. | 345/173 |
| 2012/0182244 A1* | 7/2012 | Arthur | 345/173 |

* cited by examiner

DISPLAY DEVICE AND CONTROL METHOD THEREOF

CROSS-REFERENCE TO RELATED APPLICATION

This application claims priority from Korean Patent Application No. 10-2010-0124448, filed on Dec. 7, 2010 in the Korean Intellectual Property Office, the disclosure of which is incorporated herein by reference.

BACKGROUND

1. Field

Apparatuses and methods consistent with the exemplary embodiments relate to a display device and a control method thereof, and more particularly, a display device capable of sharing contents with a neighboring device and a control method thereof.

2. Description of the Related Art

A display device such as a smart pad, a smart phone, a tablet personal computer (PC), a note PC, a large format display (LFD), a digital signage, a television (TV), a monitor, a table-type display device etc. can share contents with other neighboring display devices (hereinafter, referred to as a "neighboring device"). For example, a user of the display device transmits information displayed on a screen, which s/he is currently viewing, to a neighboring device and allows the neighboring device to display the same screen, thereby simultaneously sharing the corresponding screen with a user of the neighboring device.

However, a related art display device provides an inconvenient interface when sharing contents with a neighboring device, and it is thus inconvenient and difficult for a user to intuitively share desired contents.

SUMMARY

Accordingly, one or more exemplary embodiments provide a display device capable of providing an interface for intuitively and conveniently sharing contents with a neighboring device, and a control method thereof.

The foregoing and/or other aspects may be achieved by providing a display device including: a touch screen which displays a screen and senses a gesture of a user on the screen; a video processor which processes an image for displaying the screen; a communication unit which performs communication with at least one neighboring device; and a controller which performs control to display a miniature image of a screen of contents being displayed and a first user interface (UI) item showing a connected neighboring device of the at least one neighboring device if a first gesture of a user is made while displaying the screen corresponding to predetermined contents, and to transmit information for sharing the contents to the corresponding neighboring device in accordance with a second gesture of a user with regard to the miniature image and the first UI item.

The first gesture of a user may include one of a multi-touching gesture and a tap-and-hold gesture on the screen of the contents being displayed.

The second gesture of a user may include dragging the miniature image of the contents and dropping the miniature image in the first UI item corresponding to one of the at least one neighboring device.

The information for sharing the contents may include at least one of data of the contents and reference information through which the neighboring device can acquire the contents from an external device.

The first UI item may be arranged based on at least one of frequency of use, proximity between devices and a user's line of sight.

The controller may display a second UI item showing a screen of a neighboring device sharing the contents on the screen of the device which is displaying the miniature images of the contents, if the user switches from the content sharing screen to a screen of the single shared content.

Another aspect may be achieved by providing a control method of a display device including a touch screen, the control method including: displaying a screen containing predetermined contents on the touch screen; displaying a miniature image of a screen containing contents being displayed on at least one neighboring device and a first user interface (UI) item showing at least one connected neighboring device if a first gesture of a user is made on the screen displaying the contents of the at least one neighboring device; and transmitting information for sharing the contents to the corresponding neighboring device in accordance with a second gesture of a user with regard to the miniature image and the first UI item.

The first gesture of a user may include one of a multi-touching gesture and a tap-and-hold gesture on the screen of the contents being displayed.

The second gesture of a user may include dragging the miniature image of the contents and dropping the miniature image in the first UI item corresponding to one of the at least one neighboring device.

The information for sharing the contents may include at least one of data of the contents and reference information through which the neighboring device can acquire the contents from an external source The first UI item may be arranged on the basis of at least one of frequency of use, proximity between devices and a user's line of sight.

The control method may further include displaying a second UI item showing the neighboring device sharing the contents on the screen of the which is displaying the miniature images of the contents, if the user switches from the content sharing screen to a screen of the single shared content.

Still another aspect may be achieved by providing a display device including: a touch screen which displays a first screen and senses a gesture of a user on the screen; a video processor which process an image for displaying the first screen; a communication unit which performs communication with at least one neighboring device displaying a second screen containing predetermined contents; and a controller which performs control to display a first user interface (UI) item including a first miniature image of the first screen and a second UI item including a second miniature image of the second screen being displayed on a connected neighboring device of the at least one neighboring device to be displayed if a first gesture of a user is made while displaying the first screen, and transmit information for sharing the contents with the corresponding neighboring device in accordance with a second gesture of a user with regard to the first UI item and the second UI item.

The second gesture of a user may include dragging and dropping the second miniature image in the first UI item, and the controller may perform control to receive information for sharing the contents from the corresponding neighboring device.

The second gesture of a user may include dragging the second miniature image corresponding to the first neighboring device among the neighboring devices displaying the second screen, and dropping the second miniature image in the second UI item corresponding to the second neighboring device, and the controller may perform control to transmit information for sharing the contents from the first neighboring device to the second neighboring device.

Yet another aspect may be achieved by providing a control method of a display device including a touch screen, the control method including: displaying a first screen on the touch screen; displaying a first user interface (UI) item including a first miniature image of the first screen and a second UI item including a second miniature image of the second screen being displayed on a connected neighboring device of the at least one neighboring device to be displayed if a first gesture of a user is made while displaying the first screen; and transmitting information for sharing the contents with the corresponding neighboring device in accordance with a second gesture of a user with regard to the first UI item and the second UI item.

The second gesture of a user may include dragging and dropping the second miniature image in the first UI item, and the performing the control may include receiving information for sharing the contents from the corresponding neighboring device.

The second gesture of a user may include dragging the second miniature image corresponding to the first neighboring device among the neighboring devices displaying the second screen, and dropping the second miniature image in the second UI item corresponding to the second neighboring device, and the performing the control may include transmitting information for sharing the contents from the first neighboring device to the second neighboring device.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
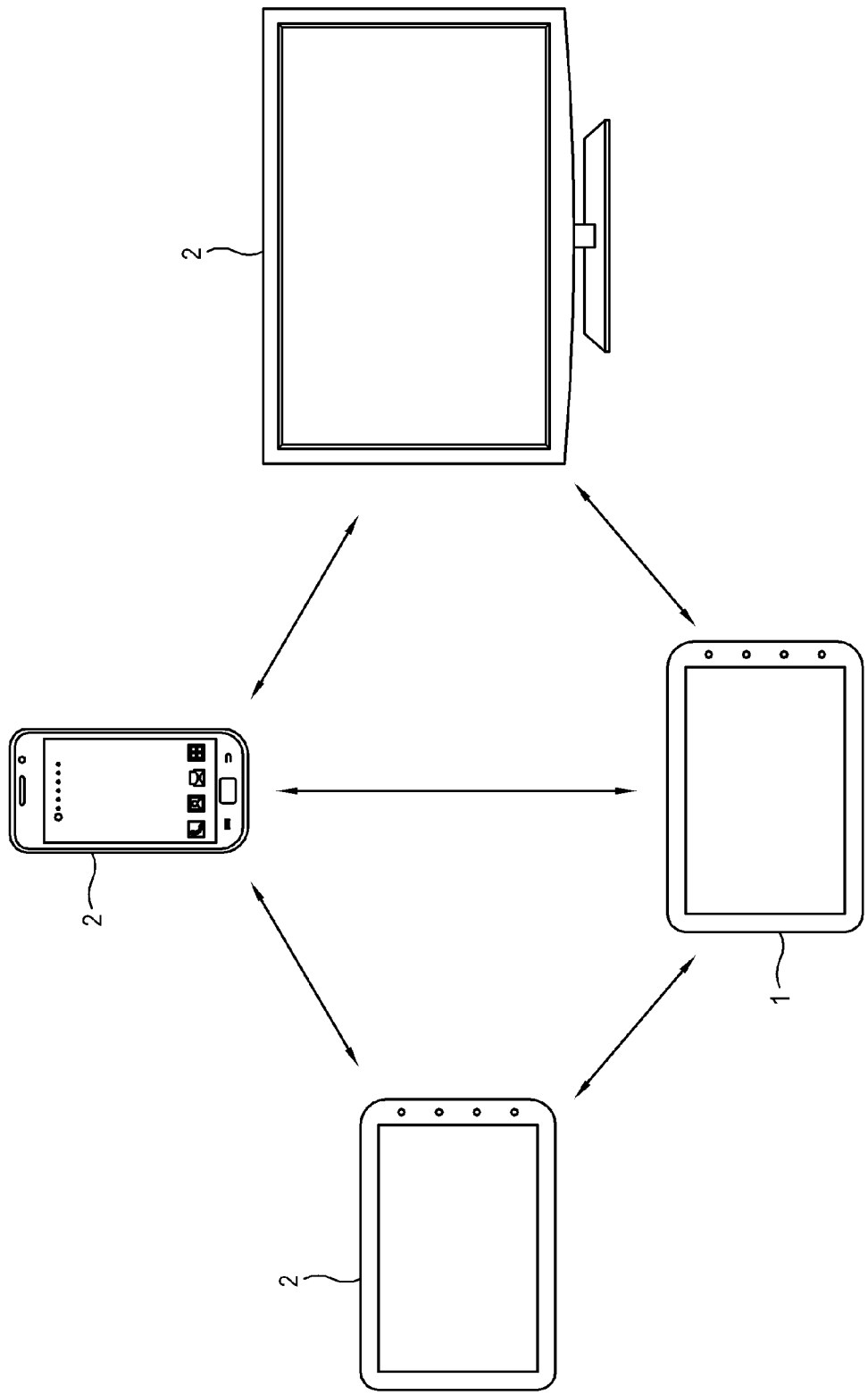
FIG. 1 shows a display device and neighboring devices according to an exemplary embodiment.

Below, exemplary embodiments will be described in detail. FIG. 1 shows a display device and neighboring devices according to an exemplary embodiment. In FIG. 1, a reference numeral 1 indicates the display device, and a reference numeral 2 indicates the neighboring devices. Each of the display device 1 and the neighboring device 2 may be embodied in a smart pad, a smart phone, a tablet personal computer (PC), a note PC, a large format display (LFD), a digital signage, a television (TV), a monitor, a table-type display device etc. There may be one or plural neighboring devices. The display device 1 and the neighboring device 2 can communicate with each other. Also, the neighboring devices 2 can communicate with one another.

The display device 1 and the neighboring device 2 can share contents with each other. According to an exemplary embodiment, for example, the contents may include video (hereinafter, referred to as a "screen"), audio, data, and anything a user can use through the display device 1 and the neighboring device 2. In this exemplary embodiment, sharing of contents refers to a situation that the display device 1 and the neighboring device 2 provide the same contents and each user of the display device 1 and the neighboring device 2 may use or view the corresponding contents through his/her own device. Here, one user may use both the display device 1 and the neighboring device 2, and may share the contents with each device. In this exemplary embodiment, sharing the contents may include sharing the contents between the display device 1 and the neighboring device 2, sharing the contents between the neighboring devices 2, and any other type of sharing. The contents to be shared may be contents being used in either of the display device 1 or the neighboring device 2 before the sharing. According to an exemplary embodiment, a start of sharing contents may be initiated by a user. A user who initiates the sharing may be a user of the display device 1 or neighboring device 2 in which the contents to be shared are being stored, or a user who wants the corresponding contents to be shared through another display device 1 or neighboring device 2. Further, a user of the display device 1 or neighboring device 2 in which the contents to be shared are stored may be the same person as a user who wants the corresponding contents to be shared through another display device 1 or neighboring device 2.

Figure 2:
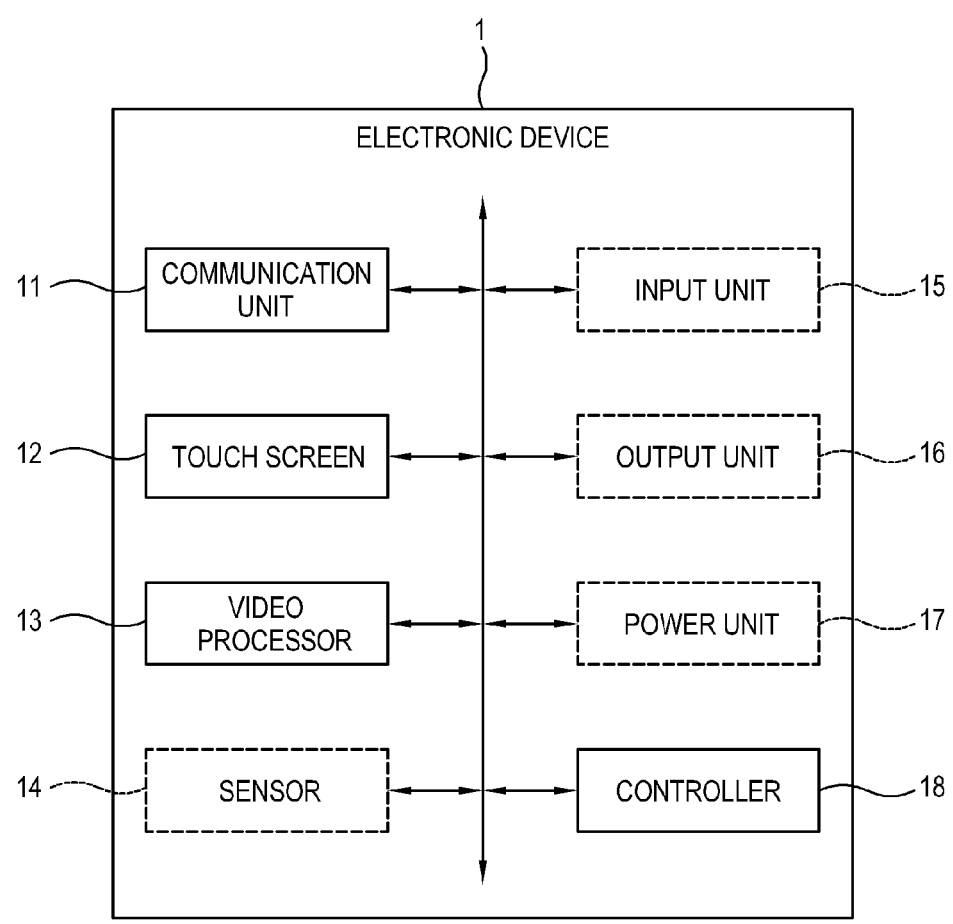
FIG. 2 is a block diagram showing a configuration of the display device shown in FIG. 1.

FIG. 2 is a block diagram showing a configuration of the display device shown in FIG. 1. As shown in FIG. 2, the display device 1 includes a communication unit 11, a touch screen 12, a video processor 13, and a controller 18. The communication unit 11 performs communication with the neighboring device 2. The communication performed by the communication unit 11 includes wireless communication. In this case, the communication unit 11 may include a radio frequency (RF) circuit to transmit and receive an RF signal. The communication unit 11 may perform the wireless communication through a wireless network (not shown) a wireless local area network (LAN), wireless fidelity (Wi-Fi), etc. Also, the communication unit 11 may perform the wireless communication with the neighboring device 2 through Bluetooth or the like method. Further, the communication unit 11 may further perform communication for Internet, telephone, message transmission/reception, etc.

The touch screen 12 has a display function and a touch input function. For the display function, the touch screen 12 includes a display device and displays a screen. A display device of the touch screen 12 may include a liquid crystal display (LCD), a light emitting polymer display (LPD), an organic light emitting diode (OLED), an active matrix organic light emitting diode (AMOLED), etc. The screen displayed on the touch screen 12 may include a graphic, a text, video, a graphic user interface (GUI), and combination thereof. The touch screen 12 may display a GUI (refer to '42' of FIG. 4 and so on) for a user's touch input under control of the controller 18 to be described later.

For the touch input function, the touch screen 12 includes a touch sensing device provided in the display device, and senses a user's touch input (hereinafter, referred to as a "gesture") on the screen displayed by the display device. The touch sensing device of the touch screen 12 senses the touch input by capacitive technology, resistive technology, infrared technology, surface acoustic wave technology, etc. A user's touch input sensed by the touch screen 12 is transmitted to the controller 18.

The video processor 13 performs video processing with regard to the screen displayed on the touch screen 12. The controller 18 performs general control of the display device 1. The controller 18 performs control for sharing contents with the neighboring device 2. The controller 18 controls the video processor 13 to display a user interface (UI, see '42' of FIG. 4 and so on) for sharing contents on the screen of the touch screen 12. The controller 18 performs control for sharing contents with the corresponding neighboring device 2 in accordance with a user's touch input sensed by the touch screen 12. In this exemplary embodiment, the controller 18 may include a processor, a memory, a peripheral interface, and an input/output subsystem. Such components of the controller 18 may communicate with each other via a communication bus or a signal line. The memory of the controller 18 may include a random access memory (RAM), a self disk, a static random access memory (SRAM), a dynamic random access memory (DRAM), a read only memory (ROM), a flash memory or a non-volatile memory. Also, the controller 18 may further include a software module and/or other various data stored, installed and/or loaded in the memory and executed or processed by a processor. The video processor 13 may be achieved by combination of hardware and/or software separately from the controller 18 or together with the controller 18.

The display device 1, as shown in FIG. 2, may further include a sensor 14, an input unit 15, an output unit 16 and a power unit 17. The sensor 14 may perform various sensing functions, and may include a light sensor, a proximity sensor, an acceleration sensor, a global positioning system (GPS) sensor, a magnetic sensor, a tilt sensor, an environment sensor, a weather sensor, etc. The input unit 15 is for inputting audio, video, etc. which may include a microphone, a camera, etc. Also, the input unit 15 may include a connector for receiving a signal from an external device. The output unit 16 may include a loudspeaker, or the like. The power unit 17 supplies power for operation of each component, and may include a battery, a charging circuit, a converter, a power control circuit, etc.

Figure 3:
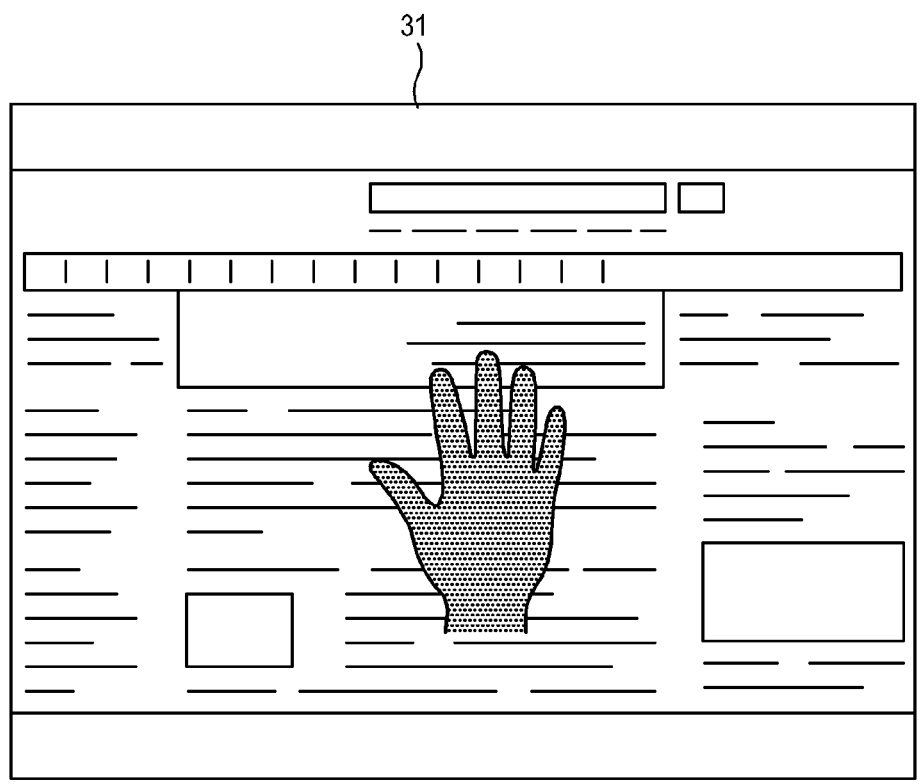
FIGS. 3 to 11 illustrate examples of screens respectively displayed on the display device and the neighboring device shown in FIGS. 1 and 2, while sharing contents.

Below, the sharing of contents between the display device 1 and the neighboring device 2 will be described in more detail. FIG. 3 is an example of a screen displayed on the display device 1 according to an exemplary embodiment. The screen 31 of FIG. 3 may be an arbitrary webpage on Internet as an example of contents to be shared. The user may initiate the sharing of contents. While reading or viewing contents, a user makes a predetermined gesture designated as a gesture to start the sharing of contents. In this exemplary embodiment, a user may make a multi-touching gesture, or a tap-and-hold gesture to start the sharing of contents. However, these gestures are just examples of the gesture to start the sharing of contents, and are not limited thereto. If such a gesture is included in a user's actions, the controller 18 starts an operation for sharing the contents, and displays a miniature image of the screen 31 corresponding to the contents.

Figure 4:
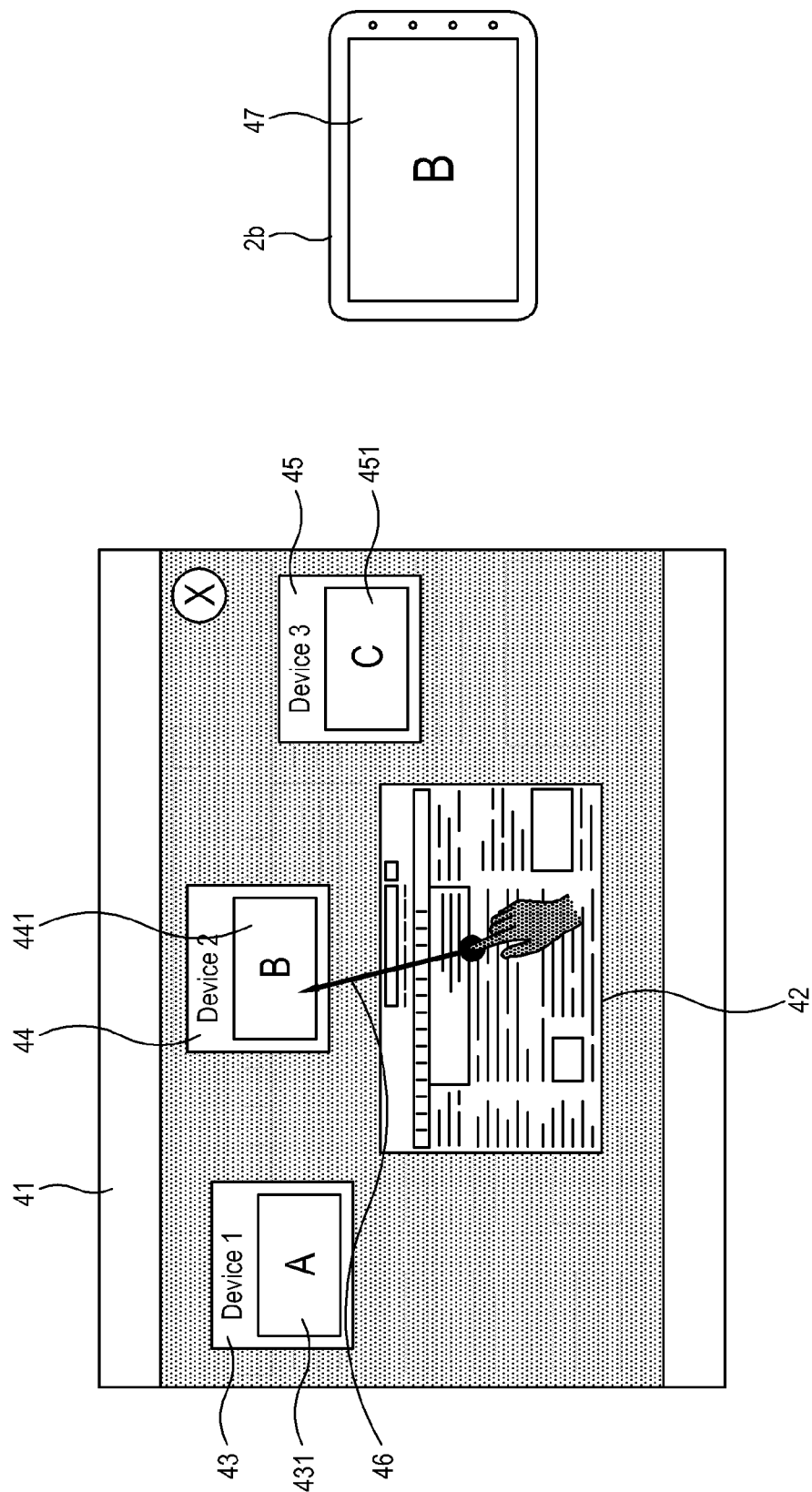

Specifically, the controller 18 displays a screen for sharing contents (hereinafter, referred to as a "content-sharing screen") in response to a user's gesture. FIG. 4 shows an example of a content-sharing screen 41 according to this exemplary embodiment. As shown in FIG. 4, the content-sharing screen 41 includes a miniature image 42 of the screen 31 corresponding to contents being displayed in the display device 1, and UI items 43, 44 and 45 indicating other connected devices among the neighboring devices 2. The UI items 43, 44 and 45 are arranged in a remaining space of the contents-sharing screen 41 so as not to be overlapped with the miniature image 42 and other UI items 43, 44 and 45.

The miniature image 42 and the UI items 43, 44 and 45 may be arranged based on at least one of frequency of use, proximity between devices and a user's line of sight, but is not limited thereto. For example, the controller 28 ascertains whether a neighboring device 2 exists in the vicinity of the display device 1 when it starts sharing the content, and displays the UI items 43, 44 and 45 corresponding to the neighboring devices 2 that are in close proximity to the display device.

The respective UI item 43, 44 and 45 may include thumbnail images 431, 441 and 451 of the screens that the corresponding neighboring devices 2 are currently displaying. The controller 18 may display the thumbnail images 431, 441 and 451 that are displayed on the corresponding UI items 43, 44 and 45 based on information received from the neighboring devices 2.

A user may determine the neighboring device 2, with which contents will be shared, through a specific gesture. In this exemplary embodiment, the contents provided by the display device 1 are shared with one of the neighboring devices 2, for example, neighboring device 2b. In FIG. 4, a reference numeral '47' indicates the screen being currently displayed on the neighboring device 2b.

To share the contents, a user drags the miniature image 42 toward the UI item 44 corresponding to the neighboring device 2b to share the content with neighboring device 2b (see a reference numeral '46'). When the miniature image 42 is dragged, the controller 18 controls the miniature image 42 to be moved in a user's dragging direction and displayed. Each respective UI items 43, 44 and 45 has a predetermined region corresponding to its size, and the controller 18 proceeds to share the corresponding contents with the neighboring device 2b when a user drops the miniature image 42 in the region of the UI item 44 corresponding to the neighboring device 2b.

The contents sharing from the display device 1 to the neighboring device 2b is achieved in such a manner that the display device 1 requests the contents sharing to the neighboring device 2b and transmits information about the contents to be shared. In this exemplary embodiment, the information about the contents may include data of contents itself, reference information for acquiring the contents from an external source, etc. The data of contents itself may be image data of a web page (refer to a reference numeral '421') for sharing, and the reference information for acquiring the contents may be an address of the web page (refer to the reference numeral '421') for the sharing. The controller 18 transmits the information about the contents to the neighboring device 2b through the communication unit 11.

Figure 5:
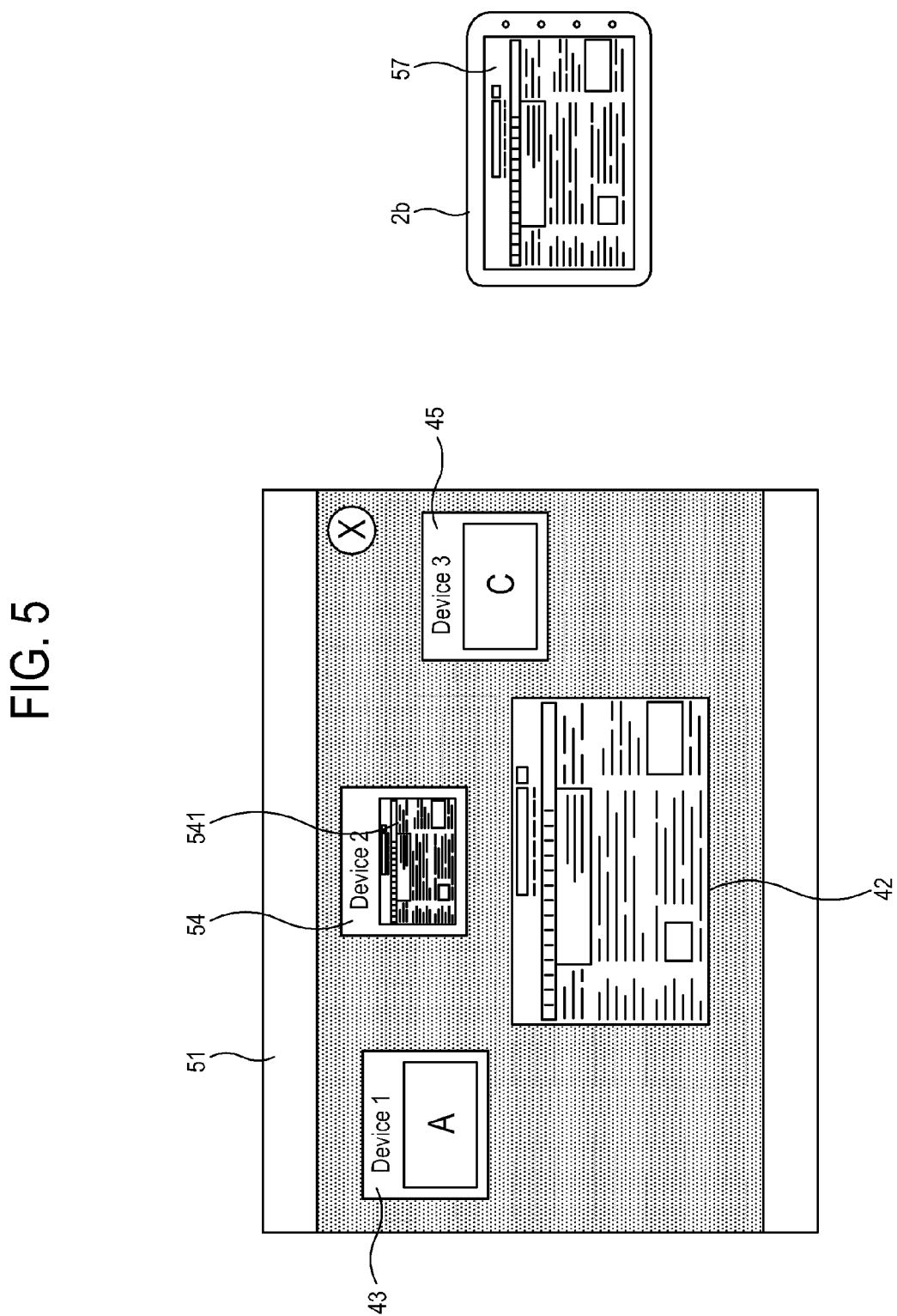

The neighboring device 2b performs an operation for sharing contents based on the information about the contents, when receiving the request for the contents sharing from the display device 1 and the information about the contents to be shared. For example, the neighboring device 2b may display the web page (refer to the reference numeral '421') as the contents to be shared. FIG. 5 shows a screen 51 displayed on the display device 1 and a screen 57 displayed on the neighboring device 2b while the contents are being shared. As shown in FIG. 5, the controller 18 may display a thumbnail image 541 of the contents shared in a UI item 54 corresponding to the neighboring device 2b if it is determined that the contents sharing operation with the neighboring device 2b is fulfilled. Also, an image 57 of the shared contents is displayed on the screen of the neighboring device 2b.

Figure 6:
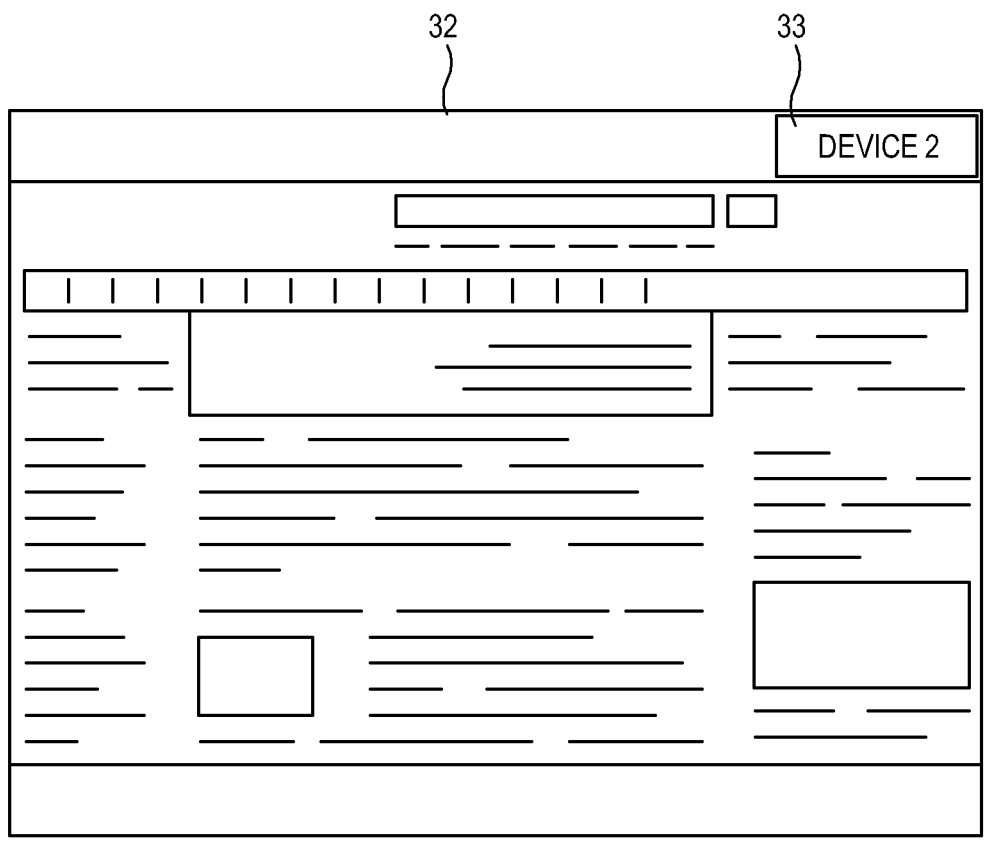

When the contents sharing is completed, the controller 18 may perform control to return to a screen of the contents by a user's instruction. FIG. 6 shows an example of a state of being returned to a contents screen 32. When returning to the screen 32 of the contents, the controller 18 may control the screen 32 to display the UI item 33 corresponding to the neighboring device 2b currently sharing the contents.

Thus, according to an exemplary embodiment, the miniature image 42 of a screen 32 of contents being displayed on the display device 1, and the UI items 43, 44 and 45 respectively corresponding to the neighboring devices 2 are shown, and the contents sharing is proceeded by a user's specific gesture, thereby enabling the contents to be more intuitively and conveniently shared with the neighboring devices 2.

Figure 7:
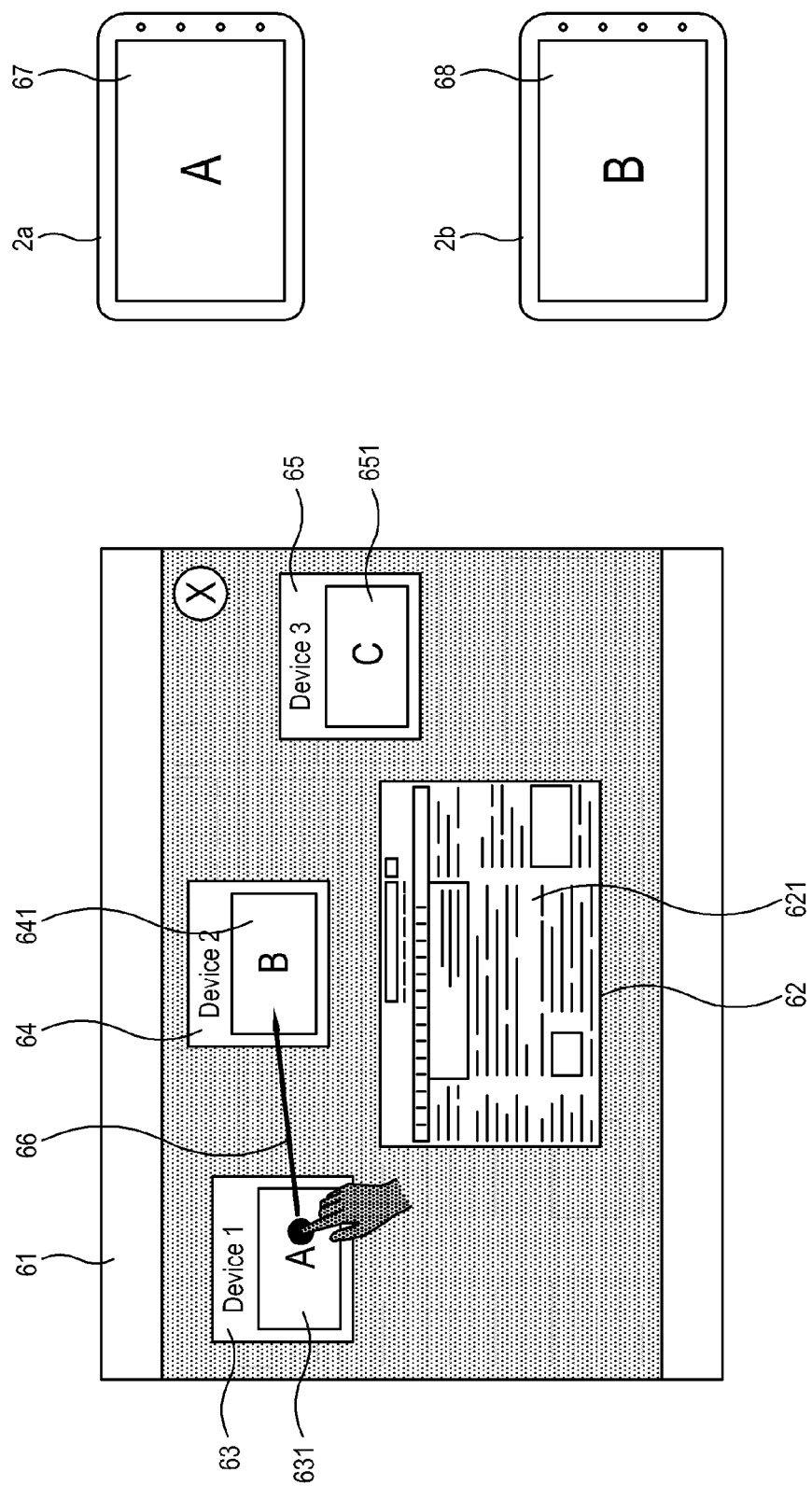
Figure 8:
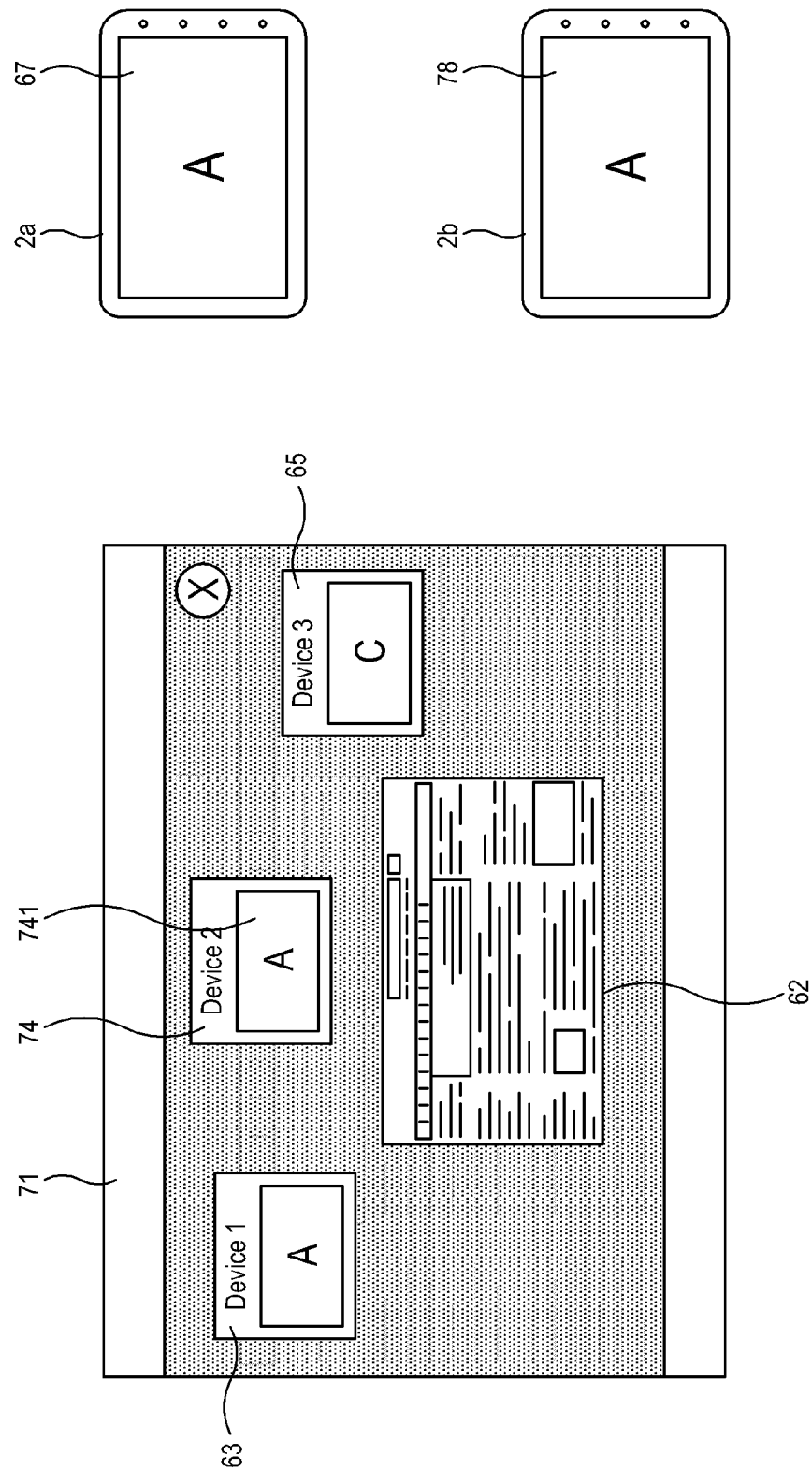

Referring to FIGS. 7 and 8, a display device 1 according to another exemplary embodiment will be described. If there is no particularly different mention about the display device 1 described with reference to FIGS. 7 and 8, repetitive descriptions will be avoided since it has the same configuration as the display device 1 described with reference to FIGS. 1 to 6. FIG. 7 illustrates a contents-sharing screen 61 based on a user's specific gesture made while the display device 1 displays the screen. In this exemplary embodiment, sharing between two neighboring devices 2a and 2b is controlled by the display device 1. Specifically, a user uses the display device 1 to share the contents provided by the neighboring device 2a with the neighboring device 2b. In FIG. 7, the reference numerals 67 and 68 indicate screens displaying contents being currently provided by the neighboring devices 2a and 2b, respectively. The contents-sharing screen 61 includes a plurality of UI items 62, 63, 64 and 65 indicating the display device 1 and the neighboring devices 2. The respective UI items 62, 63, 64 and 65 include a first miniature image 621 of the screen being displayed on the corresponding display device 1, and second miniature images 631, 641 and 651 of the screen of the contents being currently provided by the neighboring device 2.

To share the contents, a user drags the second miniature image 631 of the UI item 63 corresponding to the neighboring device 2a toward the UI item 64 corresponding to the neighboring device 2b for sharing (see a reference numeral '66'). When a user drops the second miniature image 631 in the region of the UI item 64 corresponding to the neighboring device 2b, the controller 18 proceeds to share the corresponding contents between the neighboring device 2a and the neighboring device 2b.

The contents sharing between the neighboring device 2a and the neighboring device 2b is achieved in such a manner that the display device 1 requests the contents sharing to at least one of the neighboring devices 2a and 2b. The controller 18 transmits information for requesting the contents sharing to at least of the neighboring devices 2a and 2b through the communication unit 11.

When receiving the information for requesting the contents sharing from the display device 1, at least one of the neighboring devices 2a and 2b performs an operation for sharing contents. For example, the neighboring device 2a having the contents to be shared may transmit information about the corresponding contents to the neighboring device 2b. The neighboring device 2b may display a screen corresponding to the contents to be shared based on the information about the contents transmitted from the neighboring device 2a. FIG. 8 shows screens 71, 67 and 78 displayed on the display device 1, the neighboring device 2a, and the neighboring device 2b, respectively, while the contents are being shared. As shown in FIG. 8, the controller 18 may display a second miniature image 741 of the shared contents in the UI item 74 corresponding to the neighboring device 2b if it is determined that the contents sharing between the neighboring device 2a and the neighboring device 2b is complete. Also, an image 78 of the shared contents is displayed on the screen of the neighboring device 2b.

Figure 9:
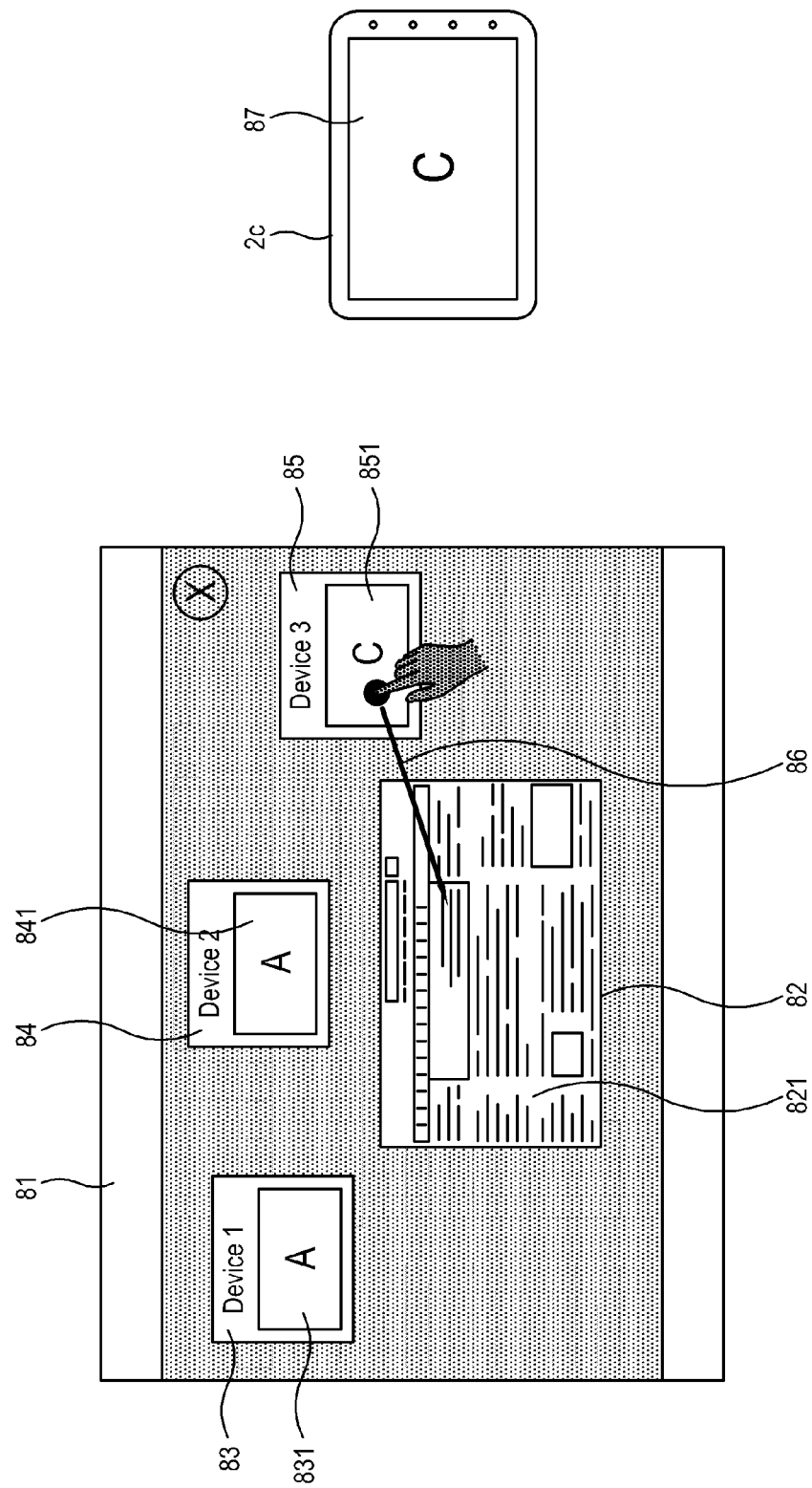
Figure 10:
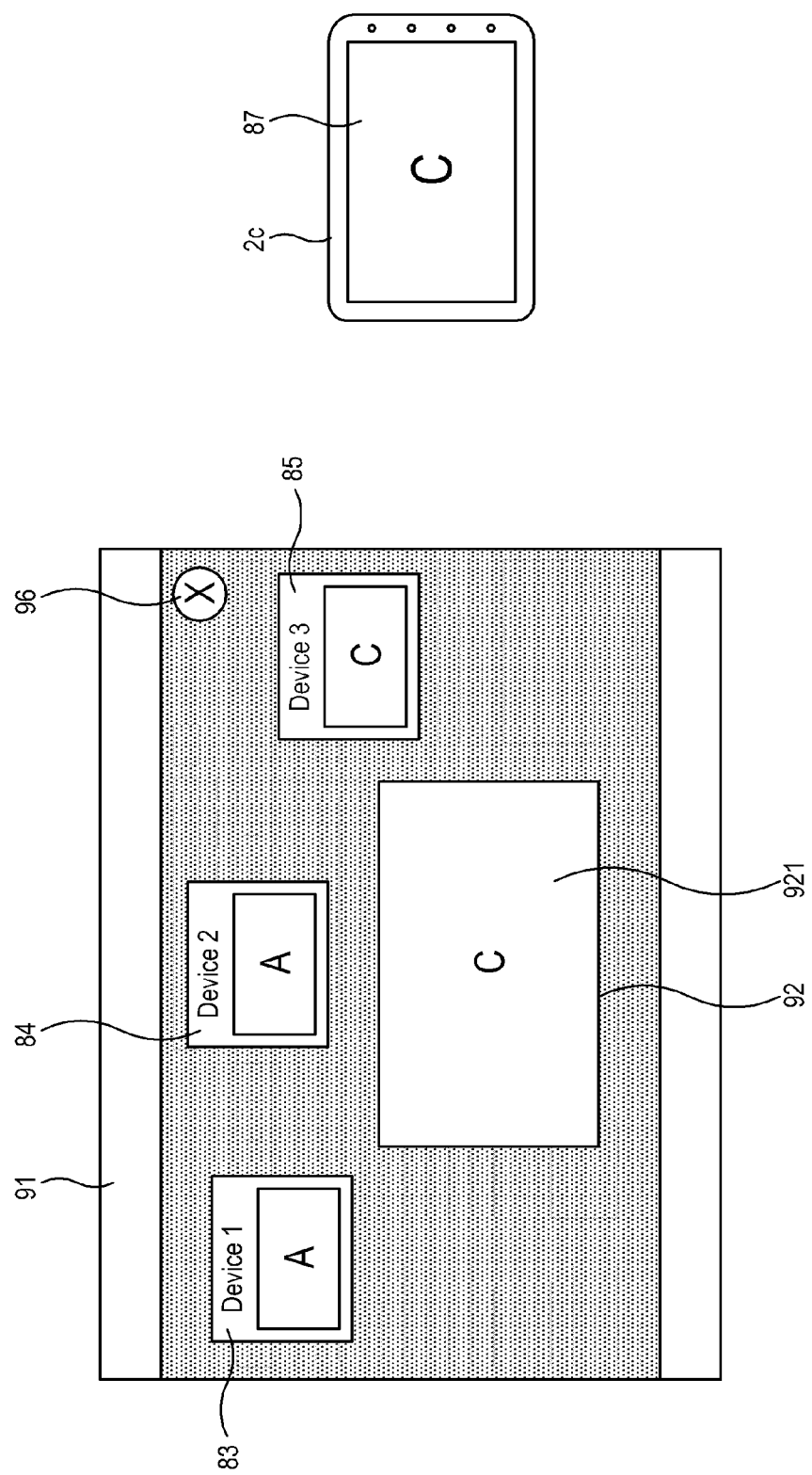
Figure 11:
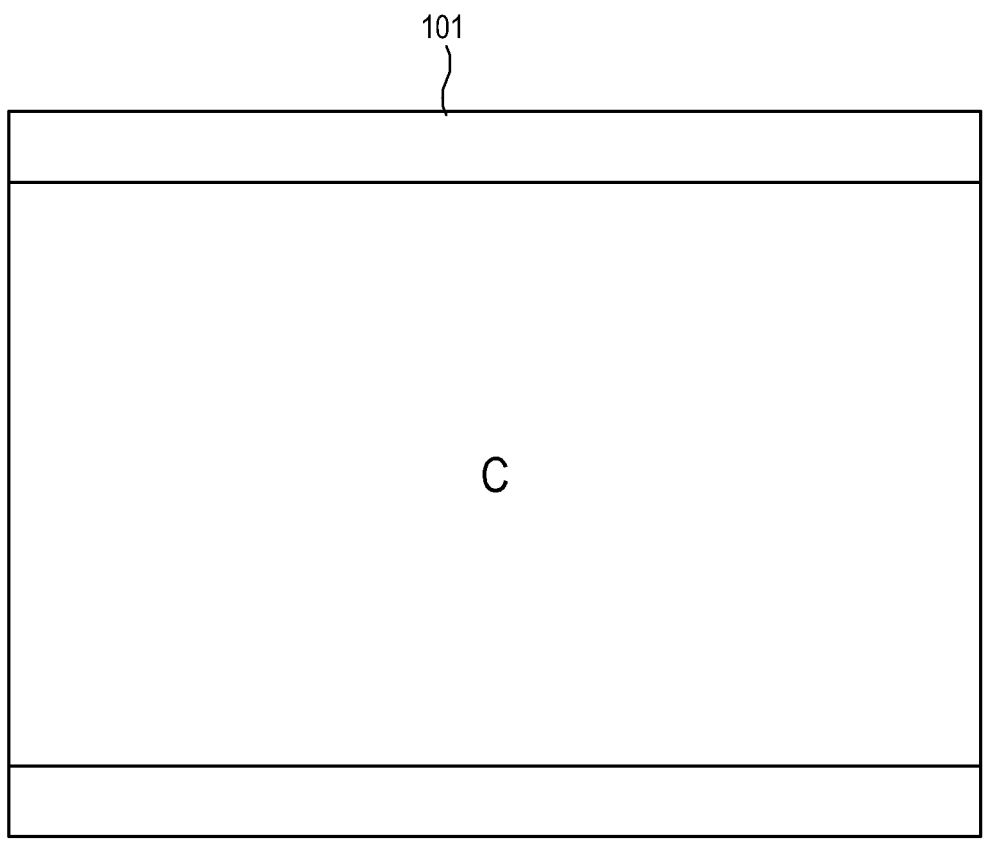

Referring to FIGS. 9 to 11, a display device 1 according to still another exemplary embodiment will be described. If there is no particularly different mention about the display device 1 described with reference to FIGS. 9 to 11, repetitive descriptions will be avoided since it has the same configuration as the display device 1 described with reference to FIGS. 1 to 8. FIG. 9 illustrates a contents-sharing screen 81 based on a user's specific gesture generated while the display device 1 displays the screen. In this exemplary embodiment, it will be described that contents provided by a neighboring device 2c among the neighboring devices is shared with the display device 1. In FIG. 9, the reference numeral 87 indicates a screen corresponding to contents being currently provided by the neighboring device 2c. The contents-sharing screen 81 includes a plurality of UI items 82, 83, 84 and 85 indicating the display device 1 and the neighboring devices 2. The respective UI items 82, 83, 84 and 85 include a first miniature image 821 of the screen on which the display device 1 is displaying the contents, and second miniature images 831, 841 and 851 of the screen on which the neighboring devices 2 are currently displaying the contents.

To share the contents, a user drags the second miniature image 851 of the UI item 85 corresponding to the neighboring device 2c toward the UI item 82 corresponding to the display device 1 for sharing (see a reference numeral '86'). When a user drops the second miniature image 851 in the region of the UI item 82 corresponding to the display device 1, the controller 18 proceeds to share the corresponding contents between the neighboring device 2c and the display device 1.

The contents sharing from the neighboring device 2c to the display device 1 is achieved in such a manner that the display device 1 requests the contents sharing to the neighboring device 2c and receives information about contents to be shared from the neighboring device 2c. Through the communication unit 11, the controller 18 requests the contents sharing to the neighboring device 2c and receives the information about the contents from the neighboring device 2b. When receiving the request for the contents sharing from the display device 1, the neighboring device 2c transmits the information about the contents, being currently provided, to the display device 1.

When receiving the information about the contents to be shared from the neighboring device 2c, the controller 18 performs an operation for sharing the contents based on the received information about the contents. FIG. 10 shows a screen 91 displayed on the display device 1 and a screen 87 displayed on the neighboring device 2c while contents are being shared. As shown in FIG. 10, the controller 18 may display a miniature image 921 of the shared contents in the UI item 92 corresponding to the display device 1 if it is determined that the contents sharing with the neighboring device 2c is complete.

A user may close the contents-sharing screen 91 and use the shared contents. The contents-sharing screen 91 may further include a UI item 96 for termination. When a user selects the UI item 96, the controller 18 switches from the contents-sharing screen 91 to a screen of the shared contents. FIG. 11 shows an example of a screen 101 of the shared contents according to an exemplary embodiment.

Figure 12:
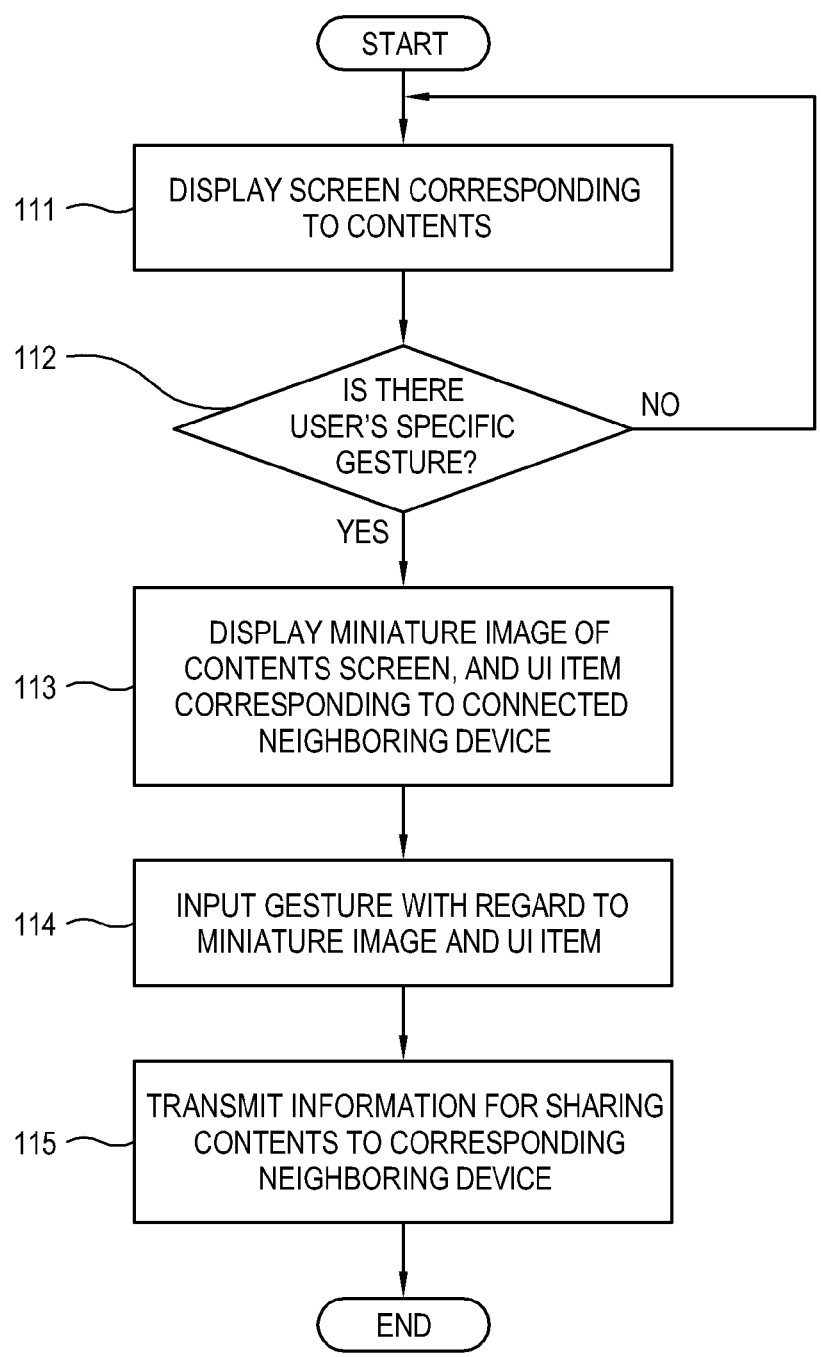
FIGS. 12 and 13 are flowcharts illustrating examples of control methods for the display device shown in FIGS. 1 to 11.

FIG. 12 is a flowchart showing an example of a control method for the display device 1 described with reference to FIGS. 1 to 11. At operation 111, a screen corresponding to predetermined contents is displayed on the display device 1. Next, at operation 112, it is determined whether a user's specific gesture is made on the screen displaying the contents. If there is a user's specific gesture, a miniature image of the screen of the display device and the UI items corresponding to at least one connected neighboring device among the neighboring devices 2 are displayed on the display device 1 at operation 113. At operation 114, a user's gesture is input with regard to the miniature image and the plurality of UI items. At operation 115, information for sharing the contents with the neighboring device 2 is transmitted in accordance with a user's gesture.

Figure 13:
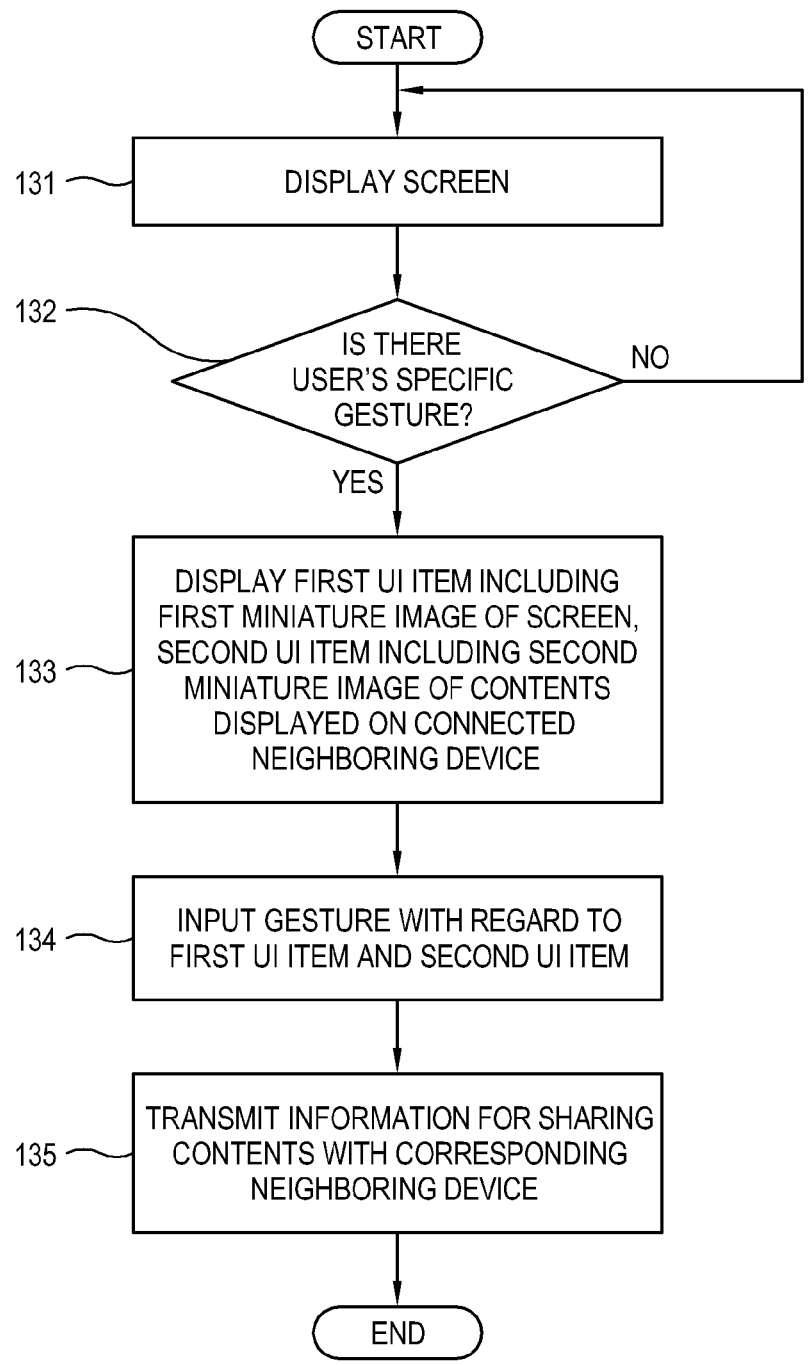

FIG. 13 is a flowchart showing another example of a control method for the display device 1 described with reference to FIGS. 1 to 11. At operation 131, a predetermined screen is displayed on the display device 1. Next, at operation 132, it is determined whether a user's specific gesture is made on the screen. If there is a user's specific gesture, a first UI item including a first miniature image of the screen of the display device, and a second UI item including a second miniature image of a screen of predetermined contents being displayed on at least one connected neighboring device among the neighboring devices 2 are displayed on the display device 1 at operation 133. At operation 134, a user's gesture is input with regard to the first UI item and the second UI item. At operation 135, information for sharing the contents with the neighboring device 2 is transmitted in accordance with a user's gesture.

As described above, it is possible to provide an interface for intuitively and conveniently sharing contents with a neighboring device.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display device comprising:
   a display which displays a screen and senses a touch input of a user on the display;
   a video processor which process an image for displaying the screen;
   a communication unit which performs communication with at least one neighboring device; and
   a controller which performs control to simultaneously display a first image indicating a miniature screen of contents which are stored in the display device and are being displayed on the display, a first user interface (UI) item which shows a first connected neighboring device, and at least a second UI item which shows at least a second connected neighboring device of the at least one neighboring device if a first touch input of the user is made while displaying the screen of the contents being displayed on the display, and to transmit information for sharing the contents to at least one of the connected neighboring devices in accordance with a second touch input of the user with regard to the first image, the first UI item and the at least second UI item,
   wherein the first image indicating the miniature screen of contents which are stored in the display device, the first UI item, and the at least second UI item are displayed in a non-overlapping manner.

2. The display device according to claim 1, wherein the first touch input of the user comprises one of a multi-touching input and a tap-and-hold input on the screen of the contents being displayed.

3. The display device according to claim 1, wherein the second touch input of the user comprises dragging the first image of the contents and dropping the first image in the first UI item corresponding to one of the at least one neighboring device.

4. The display device according to claim 1, wherein the information for sharing the contents comprises at least one of data of the contents and reference information through which the neighboring device can acquire the contents from an external source.

5. The display device according to claim 1, wherein the first UI item is arranged based on at least one of frequency of use, proximity between devices and a user's line of sight.

6. The display device according to claim 1, wherein the controller displays the second UI item on the display showing the second connected neighboring device sharing the contents.

7. A control method of a display device comprising a display, the control method comprising:
   displaying a screen corresponding to predetermined contents on the display;
   simultaneously displaying a first image indicating a miniature screen of contents which are stored in the display device and are being displayed on the display, a first user interface (UI) item showing a first connected neighboring device, and at least a second UI item which shows at least a second connected neighboring device if a first touch input of a user is made on the display displaying the screen of the contents; and
   transmitting information for sharing the contents to at least one of the connected neighboring devices in accordance with a second touch input of the user with regard to the first image and the first UI item and the at least second UI item,
   wherein the first image indicating the miniature screen of contents which are stored in the display device, the first UI item, and the at least second UI item are displayed in a non-overlapping manner.

8. The control method according to claim 7, wherein the first touch input of the user comprises one of a multi-touching input and a tap-and-hold input on the screen of the contents being displayed.

9. The control method according to claim 7, wherein the second touch input of the user comprises dragging the first image of the contents and dropping the first image in the first UI item corresponding to one of the at least one neighboring device.

10. The control method according to claim 7, wherein the information for sharing the contents comprises at least one of data of the contents and reference information through which the neighboring device can acquire the contents from an external source.

11. The control method according to claim 7, wherein the first UI item is arranged based on at least one of frequency of use, proximity between devices and a user's line of sight.

12. The control method according to claim 7, further comprising displaying the second UI item on the display showing the second connected neighboring device sharing the contents.

13. A display device comprising:
   a display which displays a first screen of a content stored in the display device and which senses a touch input of a user on the display;
   a video processor which processes an image which displays the processed image on the first screen;
   a communication unit which performs communication with a first connected neighboring device which displays a second screen containing predetermined contents and at least a second connected neighboring device which displays a third screen; and
   a controller which performs control to simultaneously display a miniature image of a first user interface (UI) item comprising a first image indicating the first screen, a second UI item comprising a second image indicating the second screen being displayed on the first connected neighboring device, and at least a third UI item comprising a third image indicating the third screen being displayed on the at least one second connected neighboring device if a first touch input of the user is made on the display while displaying the first screen, and transmits information for sharing the contents with the first connected neighboring device in accordance with a second touch input of the user with regard to the first UI item, the second UI item, and the at least third UI item, wherein the miniature image of the first UI item comprising the first image indicating the first screen of content stored in the display device does not overlap the second UI item, and the at least third UI item.

14. The display device according to claim 13, wherein the second touch input of the user comprises dragging and dropping the second image in the first UI item, and the controller performs control to receive information for sharing the contents from the corresponding neighboring device.

15. The display device according to claim 13, wherein the second touch input of the user comprises dragging the second image corresponding to the first connected neighboring device among the neighboring devices displaying the second screen, and dropping the second image in the third UI item corresponding to the second connected neighboring device, and the controller performs control to transmit information for sharing the contents from the first connected neighboring device to the second connected neighboring device.

16. A control method of a display device comprising a display, the control method comprising:

displaying a first screen on the display;

displaying a miniature image of a first user interface (UI) item comprising a first image stored in the display device and indicating the first screen, a second UI item comprising a second image indicating a second screen being displayed on a first connected neighboring device, and at least a third UI item indicating a third screen being displayed on at least a second connected neighboring device to be displayed if a first touch input of a user is made on the display while displaying the first screen; and transmitting information for sharing contents with the first connected neighboring device or the at least second connected device in accordance with a second touch input of the user with regard to the first UI item, the second UI item, and the third UI item, wherein the miniature image of the first UI item comprising the first image indicating the first screen of content stored in the display device does not overlap the second UI item and the at least third UI item.

17. The control method according to claim 16, wherein the second touch input of the user comprises dragging and dropping the second image in the first UI item, and the performing the control comprises receiving information for sharing the contents from the first connected neighboring device.

18. The control method according to claim 16, wherein the second touch input of a user comprises dragging the second image corresponding to the first connected neighboring device among the neighboring devices displaying the second screen, and dropping the second image in the third UI item corresponding to the second connected neighboring device, and the performing the control comprises transmitting information for sharing the contents from the first connected neighboring device to the second connected neighboring device.

19. A display device comprising:

a display configured to display a screen;

a user command receiver configured to receive a user command;

a communication unit configured to perform communication with at least one neighboring device; and a controller configured to perform control to simultaneously display a first miniature image indicating a screen of contents which are stored in the display device and are being displayed on the display, a first user interface (UI) item which shows a first connected neighboring device, and at least a second UI item which shows at least a second connected neighboring device of the at least one neighboring device, in response to a first user command being received while displaying the screen of the contents being displayed on the display, and to transmit information for sharing the contents to at least one of the connected neighboring devices in response to a second user command with regard to the first image, the first UI item and the at least second UI item, wherein the first image indicating the miniature screen of contents which are stored in the display device, the first UI item, and the at least second UI item are displayed in a non-overlapping manner.

20. The display device according to claim 19, wherein the user command comprises a touch input on the display displaying the screen.

21. A display apparatus comprising:

a display, of a main device, configured to display a screen;

a user command receiver configured to receive a command;

a communication unit configured to perform communication with at least one neighboring device; and a controller configured to perform a control operation to display a miniature image indicating a screen of contents which are being displayed on the display in response to a first command for sharing the contents, to display a first user interface (UI) item which shows at least one connected neighboring device in response to a second command being received while displaying the miniature image, and to transmit information, for switching a display of the at least one of the connected neighboring devices to display the screen of contents of the main device, to at least one of the connected neighboring devices in response to a third command with regard to the miniature image and the first UI item, wherein the miniature image and the first UI item are displayed in a non-overlapping manner, and the third command is a gesture.

22. The display apparatus according to claim 21, wherein the first command comprises one of a multi-touching input and a tap-and-hold input on the screen of contents being displayed.

23. The display apparatus according to claim 21, wherein the third command comprises dragging the miniature image of the screen of contents and dropping the miniature image in the first UI item corresponding to one of the at least one neighboring device.

24. The display apparatus according to claim 21, wherein the information for displaying the contents comprises at least one of data of the contents and reference information through which the neighboring device can acquire the contents from an external source other than the display apparatus.

25. The display apparatus according to claim 21, wherein the first UI item is arranged based on at least one of frequency of use, proximity between devices and a user's line of sight.

26. The display apparatus according to claim 21, wherein the controller is further configured to display a second UI item which shows at least one second connected neighboring device of the at least one neighboring device on the display simultaneously with the first UI item.

27. The display apparatus according to claim 21, wherein the controller is further configured to display a second UI item which shows at least one second connected neighboring device in response to the second command being received while displaying the miniature image, and
wherein the miniature image indicating the screen of contents which are displayed on the display device, the first UI item and the second UI item are simultaneously displayed in a non-overlapping manner by the display.

28. A display apparatus comprising a display, of a main device, configured to display a screen;
a user command receiver configured to receive a command;
a communication unit configured to perform communication with at least one neighboring device; and
a controller configured to perform a control operation to display a miniature image indicating a screen of contents which are being displayed on the display and to display a first user interface (UI) item which shows at least one connected neighboring device in response to at least one of first command being received to display the miniature image and the first UI item, and to transmit information, for switching a display of the at least one of the connected neighboring devices to display the screen of contents of the main device, to at least one of the connected neighboring devices in response to at least one of second command with regard to the miniature image and the first UI item,
wherein the miniature image indicating the screen of contents which are displayed on the display device and the first UI item are simultaneously or sequentially displayed in a non-overlapping manner in response to the at least one of first command, and
the third command is a gesture.

* * * * *